United States Patent [19]

Mahrus

[11] 4,365,399
[45] Dec. 28, 1982

[54] MANUFACTURE OF LIGHT WEIGHT PISTONS

[75] Inventor: Duraid Mahrus, Sao Paulo, Brazil

[73] Assignee: Metal Leve S.A. Industria e Comercio, Brazil

[21] Appl. No.: 187,344

[22] Filed: Sep. 15, 1980

Related U.S. Application Data

[63] Continuation-in-part of Ser. No. 56,190, Jul. 10, 1979, abandoned.

[30] Foreign Application Priority Data

Jul. 12, 1978 [BR] Brazil ............................... 17804521

[51] Int. Cl.³ ...................... B23P 15/10; B22D 13/00
[52] U.S. Cl. ............................... 29/156.5 R; 164/108; 164/112; 164/114
[58] Field of Search ................... 29/156.5 R; 164/108, 164/98, 112, 103, 105, 114, 132, DIG. 8; 92/224-229

[56] References Cited

U.S. PATENT DOCUMENTS

| | | | |
|---|---|---|---|
| 1,396,341 | 11/1921 | Rautenbach | 164/108 |
| 1,717,916 | 6/1929 | Campbell | 164/DIG. 8 |
| 1,727,119 | 9/1929 | Troeger | 29/156.5 R |
| 2,166,634 | 7/1939 | Lesage | 164/114 |
| 2,620,530 | 12/1952 | Sulprizio | 29/156.5 R |
| 2,778,162 | 1/1957 | Giffen | 164/114 |
| 3,012,831 | 12/1961 | Cheney et al. | 92/224 |
| 3,276,082 | 10/1966 | Thomas | 164/105 |
| 3,305,918 | 2/1967 | Christen et al. | 29/156.5 R |
| 3,371,703 | 3/1968 | De Wilde | 164/98 |
| 3,533,329 | 10/1970 | Galli | 29/156.5 R |

FOREIGN PATENT DOCUMENTS

| | | | |
|---|---|---|---|
| 238258 | 4/1962 | Australia | 164/108 |
| 404874 | 7/1966 | Switzerland | 29/156.5 R |

Primary Examiner—Daniel C. Crane
Attorney, Agent, or Firm—Steinberg & Raskin

[57] ABSTRACT

A method of manufacture of novel light-weight pistons of aluminum forgings with an integral iron insert ring by fusion welding is described. The aluminum piston forging is provided with a configuration adapted to receive the iron insert ring which may be coated to provide an inter-metallic joining alloy. The configured piston forging is placed in a mold, the ring is positioned in the configuration. The mold is rotated and molten alloy is introduced at an angle to deoxidize the forging and the ring, sweep the oxides to non-critical areas of the mold and to join the forging to the ring upon cooling to form a fusion weld.

9 Claims, 5 Drawing Figures

U.S. Patent      Dec. 28, 1982      4,365,399
FIG. 1
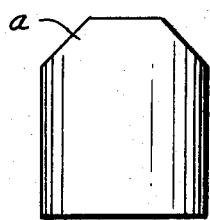
FIG. 1a
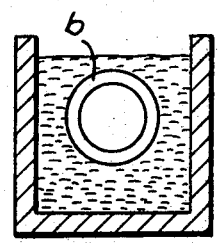
FIG. 2
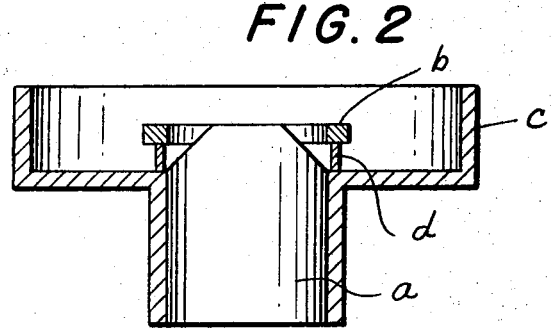
FIG. 3
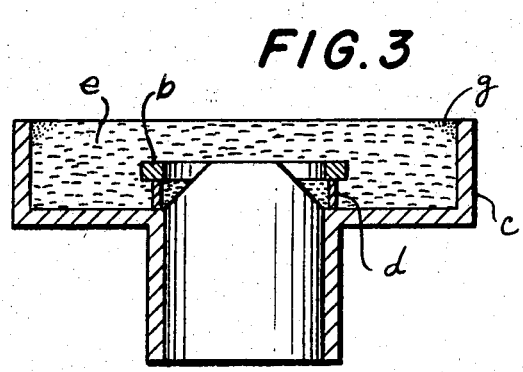
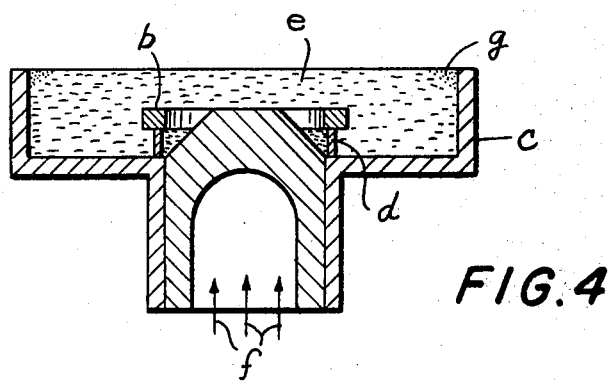
FIG. 4

MANUFACTURE OF LIGHT WEIGHT PISTONS

CROSS REFERENCE TO RELATED APPLICATIONS

This application is a continuation-in-part of my co-pending application Ser. No. 056,190 filed July 10, 1979, now abandoned entitled "A Method of Manufacturing a Piston By Means of Fusion Welding".

BACKGROUND OF THE INVENTION

This invention relates to pistons for internal combustion engines and more particularly to pistons and a method of making the same of forged aluminum with a fusion welded wear-resistant ferrous alloy crown insert.

The advantages of light weight pistons for internal combustion engines have been appreciated for a long time as shown in U.S. Pat. No. 1,727,119. Very early it was suggested that the pistons be made of aluminum whose defects of uneven expansion and poor hot-strength were recognized in the aforesaid U.S. Pat. No. 1,727,119. Also recognized was the feasibility of providing cast aluminum pistons with iron elements such as inserts and skirts to improve the wear and strength as shown in U.S. Pat. Nos. 1,717,916; 3,012,831; and 3,305,916. In the latter patent the aluminum piston is cast around a ring insert positioned in a mold and the interior of the piston is then formed by a forging operation.

The better mechanical and thermal properties of forged aluminum alloy pistons for meeting the requirements of internal combustion engines is recognized. However completely forged aluminum alloy pistons having ferrous metal ring inserts have not been successful due to the absence of an integral metal bond between the iron insert and the pre-forged piston. The previous method of making pistons with ring inserts, as shown in the mentioned prior art, required casting of the piston with the ring in place to form a metallic bonding between the ring insert and the cast piston body.

However, as mentioned, the joining of the iron insert to the pre-forged aluminum piston does not provide the required bonding.

SUMMARY OF THE INVENTION

It is an object of this invention to provide a light weight composite piston for internal combustion engines comprising a forged aluminum piston body integrally joined to an iron crown insert ring and a method for making such composite pistons.

Other objects and advantages of the present invention will be apparent from a further reading of the specification and of the appended claims.

With the above and other objects in view, the present invention mainly comprises the method of:

(a) forging a piston body of aluminum alloy with a configuration adapted for a ring insert, (b) positioning a ring insert of an iron alloy in the configuration to form an assembly, (c) inserting the assembly into a confining mold, (d) heating the surface of the assembly to temperatures below the melting point of the forging, and (e) directing the flow of a molten aluminum alloy, at an oxide-removing angle, into the space formed by the configuration in the piston body-forging and the ring insert to fusion weld the insert to the piston body at the configuration.

The invention further comprises as a new product, a forged aluminum piston body having an iron insert fusion-welded to the body via an intermetallic alloy layer.

BRIEF DESCRIPTION OF THE DRAWINGS

The invention will be more completely described with reference to the drawings, in which:

FIG. 1 is a sectional view of the forged piston body with a configuration adapted to conform with a ring insert.

FIG. 1a is a sectional view of the iron ring insert dipped in a vessel containing a molten alloy, FIG. 2 is a sectional view showing the positioning of the forged aluminum body in a mold, FIG. 3 is a sectional view showing the mold assembly of FIG. 2 after the addition of the molten alloy, and FIG. 4 is a sectional view of the mold similar to that of FIG. 3 but showing a variation thereof.

DESCRIPTION OF PREFERRED EMBODIMENTS

Referring more particularly to the drawing, FIG. 1 shows a sectional view of the forged piston body with the configuration a formed thereon adapted to conform to the ring insert. In FIG. 1a there is a sectional view of the iron ring insert b dipped in a vessel containing a molten alloy suitable for coating the ring insert with an alloy capable of forming an intermetallic fusion bond between the coated insert and the aluminum alloy. FIG. 2 shows the positioning of the forged piston body a in a mold c, with ring insert b in place and supported by pins d to provide a flow clearance between the forged body a and ring b.

FIG. 3 shows the mold assembly of FIG. 2 after the addition of molten aluminum alloy to form the fusion weld joint in the clearance between forged piston body a and ring b. The oxides g dislodged from the surfaces of forged piston body a and ring b by the pouring of the alloy into the mold c are swept and accumulated at the periphery of the mold as a result of spin imparted to the mold during the pouring operation.

FIG. 4 is similar to FIG. 3 but shows a variant wherein solidification of the alloy forming the fusion weld is encouraged by cooling the forged piston by blowing a cooling gas into the hollow interior of the forged piston.

The forged piston can be made of any of the recognized aluminum forging alloys such as SAE 39 corresponding to STM-CN 42A; SAE 332 corresponding to SC 103A and alloy M-138 equivalent to AFNOR-AS 20U which is a hyper-eutectic (18% Si) alloy useful for diesel engine pistons. Any of the traditional commonly used aluminum forging techniques may be used for fashioning the piston bodies.

The modification of the upper portions of the piston body to provide a suitable configuration for accommodating the ring insert may be made roughly during the forging step and then finish machined or it may be directly machined in the forging. A suitable clearance between the ring insert and the piston body to enable dislodging and sweeping of the oxides from the metal surfaces by the molten alloy forming the fusion weld between the insert and the piston body is essential to a proper configuration.

The forged piston adapted to receive the insert is then placed in a mold of greater volume than the final piston volume, the insert is properly positioned relative to the piston body and the piston and mold are preferably (but not necessarily) heated in an inert atmosphere to a convenient temperature, preferably about 500° C. This temperature is below the melting point of the alloy used for the forging and also below the temperature of the molten alloy used for the fusion welding of the insert to the piston body.

The heated mold with the assembly, consisting of the forged piston body and the positioned insert ring, is rotated about the axis perpendicularly passing through the assembly. The molten alloy is introduced into the rotating mold via a funnel or any similar channel at an angle of about 30° C. to the axis of rotation. Introduction of the molten alloy flow in this manner has been found to provide complete dislodging of any oxides from the surfaces of the piston body and insert ring. This dislodging flow together with the forces resulting from the rotation of the mold removes the dislodged oxides to the upper periphery of the mold into the excess volume of the mold, where, upon solidification, the accumulated oxides can be removed by machining.

The speed of rotation of the mold is adjusted to provide sufficient forces to sweep the oxides floating on the molten surface to the peripheral portion of the mold before the molten metal congeals.

As a typical characteristic of aluminum alloys is the formation of an $Al_2O_3$ oxide layer on its solid surfaces, it is essential that this oxide layer be removed from those areas where a fusion weld is to be formed. To this end the pouring of the molten alloy at the most effective impingement angle (about 30°) and the rotation of the mold washes the oxidized surface free from oxide and promotes the dragging of the oxides from the areas where the fusion weld takes place. Any molten aluminum alloy will serve for this washing and dragging deoxidation step.

The speed of mold rotation of course depends on the piston size. The smaller the piston the greater the speed of mold rotation. In the range of piston sizes commonly used for internal combustion engines rotational speeds in the range 12 to 60 rpm are adequate.

That portion of the assembly consisting of the configured forged aluminum piston body and the iron ring insert positioned therein is filled with a suitable molten alloy. As mentioned above, the filling alloy should wash the surfaces to be joined free from oxides and should bond to both the aluminum forging and the iron insert by fusion welding. Thus a perfect intermetallic bond is formed between the iron insert, the molten alloy and the forging. This bond is free from any oxides which would embrittle the bond or otherwise cause weakening in the areas of the weld joint.

It has also been noted that better hot-hard characteristics are obtained in the areas of the fusion welded pistons if the inside of the forged piston is cooled during or preferably after the flowing of the molten alloy into the mold. A preferred alloy for flowing to form the fusion weld is ASTM CN42A.

It is preferred, according to this invention, to provide the iron ring insert with an Alfin alloy coating. The Aflin alloys are useful for providing molecular bondings of light metals such as aluminum and magnesium and alloys thereof, to dissimilar metals such as ferrous metals and alloys, titanium, nickel, cobalt etc. It enables the formation of bi-metallic joints combining the desirable properties of both metals being joined. The bonded construction provides structures combining the strength hardness and fatigue resistance of the ferrous type metals with the light-weight, high heat-conductivity, bearing properties, oxidation resistance and other properties of aluminum and magnesium. The process essentially consists of diffusing the light metal unto the ferrous metal to form a thin layer of a combined alloy. In the present case it consists of diffusing aluminum unto steel or cast iron to form a thin layer of ferro-aluminum alloy over the areas of the steel or cast iron insert to be bonded and then pouring an aluminum alloy to join the diffused ferro-aluminum alloy layer to the aluminum forging. The ferro-aluminum alloy consists of the intermetallic compound of iron and aluminum designated by the formula: $Al_yFe_x$. The atomic ratios will vary with the alloy constituents of the specific ferrous alloy and the specific aluminum alloys. However, the primary constituent is $Al_5Fe_2$ (Eta-phase). The bond can be considered to include four graded zones: unchanged iron, a thin layer of a solid solution of aluminum in iron, the Eta-phase inter-metallic compound $Al_5Fe_2$; and the aluminum layer permeated with $Al_5Fe_2$.

The basic procedure for forming the Alfin bonding layer on ferrous metals is well known and for insertion of the ring inserts used in this invention is modified to comprise degreasing and cleaning the iron insert until free of oxides, immersing the ring insert into the bath of molten Alfin alloy to form an inter-metallic alloy coating thereon, positioning the coated ring on the piston in the mold, starting the rotation of the mold with heating, pouring the deoxidizing aluminum alloy to form the fusion weld, cooling the mold, unmolding the assembly, and machining the excess metal and oxides from the forged piston integrally joined to the ring insert by fusion welding.

The process of this invention includes the aspects of joining the piston body to another alloy material of suitable characteristics. In such cases one may bond one material having desirable properties such as thermal resistance on the head of the piston exposed to the combustion gases. By flowing the second alloy properly over the first alloy it is possible to obtain perfect fusion weld joints between a hypereutectic aluminum alloy containing 18% Si(AFNOR-AS20U) and a hypoeutectic 4% Cu alloy (ASTM CN42A).

While the invention has been illustrated with respect to particular constructions, it is apparent that variations and modifications of the invention can be made.

What is claimed is:

1. A method of manufacturing light weight composite internal-combustion engine pistons which comprises forging a piston body of aluminum alloy with a configuration adapted for a ring insert, positioning a ring insert of an iron alloy in juxtation to and with a clearance between it and said configuration to form an assembly, inserting said assembly in a confining mold, heating the surface of said assembly to temperatures below the melting point of said forging, rotating said mold and while said mold is being rotated directing a flow of a molten aluminum alloy at an oxide-removing angle into the space formed by the clearance between the configuration in said piston body forging and said insert to fusion weld said insert to said piston body at said configuration, said rotation of said mold while said flow of molten aluminum alloy is being directed therein at said oxide removing angle causing oxides to dislodge from the surfaces of the piston body and insert ring and flow to the upper periphery of the mold where the same can be removed, thus effecting integral bonding of the piston body to the ring insert.

2. The process according to claim 1 wherein the flow of said molten alloy is at an angle of at least 30°.

3. The process according to claim 1 wherein the surface of said iron ring insert is pretreated to form an inter-metallic bond with the forged aluminum.

4. The process according to claim 3 wherein said pretreatment comprises coating said iron alloy with at least one inter-metallic compound consisting of iron and aluminum.

5. The process according to claim 4 wherein at least one compound is the Eta-phase inter-metallic compound of the formula $Al_5Fe_2$.

6. The process according to claim 3 wherein said pretreatment comprises the step of immersion of the insert ring in a bath of molten Alfin alloy.

7. The method according to claim 1 wherein said mold is provided with a peripheral riser for accumulating said dislodged and swept aluminum oxides.

8. The process according to claim 1 and wherein after solidification the accumulated oxides are removed by machining.

9. Method according to claim 1 wherein the heating is effected in an inert atmosphere to a temperature of about 500° C.

* * * * *